US009882816B2

(12) United States Patent
Xu et al.

(10) Patent No.: US 9,882,816 B2
(45) Date of Patent: Jan. 30, 2018

(54) METHOD OF MAPPING CSI-RS PORTS TO RESOURCE BLOCKS, BASE STATION AND USER EQUIPMENT

(71) Applicant: Panasonic Intellectual Property Corporation of America, Torrance, CA (US)

(72) Inventors: Ming Xu, Beijing (CN); Masayuki Hoshino, Kanagawa (JP); Kazuki Takeda, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 65 days.

(21) Appl. No.: 14/779,553

(22) PCT Filed: Apr. 9, 2013

(86) PCT No.: PCT/CN2013/073939
§ 371 (c)(1),
(2) Date: Sep. 23, 2015

(87) PCT Pub. No.: WO2014/166052
PCT Pub. Date: Oct. 16, 2014

(65) Prior Publication Data
US 2016/0050153 A1 Feb. 18, 2016

(51) Int. Cl.
*H04L 12/803* (2013.01)
*H04L 5/00* (2006.01)
(Continued)

(52) U.S. Cl.
CPC ......... *H04L 47/125* (2013.01); *H04B 7/0413* (2013.01); *H04L 5/0023* (2013.01);
(Continued)

(58) Field of Classification Search
None
See application file for complete search history.

(56) References Cited

U.S. PATENT DOCUMENTS 8,571,067 B2  10/2013  Guo et al.
8,774,226 B2   7/2014  Guo et al.
(Continued)

FOREIGN PATENT DOCUMENTS

CN    102437987 A    5/2012
CN    102754458 A   10/2012

OTHER PUBLICATIONS

3GPP TR 37.840 V12.0.0, "3rd Generation Partnership Project; Technical Specification Group Radio Access Network; Study of Radio Frequency (RF) and Electromagnetic Compatibility (EMC) requirements for Active Antenna Array System (AAS) base station (Release 12)," Mar. 2013, 84 pages.

(Continued)

*Primary Examiner* — Kouroush Mohebbi
(74) *Attorney, Agent, or Firm* — Seed IP Law Group LLP

(57) ABSTRACT

The present disclosure provides a communication method that a base station configures different CSI-RS ports with different periodicity based on UE requirement (e.g. mobility) to reduce CSI-RS overhead. And another method is to transmit partial CSI-RS ports in a cyclic shifted manner to further reduce the overhead. In addition, cyclic shifted transmission of split CSI-RS port groups are proposed to reduce the potential big difference of interference onto different CSI-RS port groups.

9 Claims, 7 Drawing Sheets

(51) Int. Cl.
*H04B 7/0413* (2017.01)
*H04W 88/08* (2009.01)
*H04W 88/02* (2009.01)

(52) U.S. Cl.
CPC .......... *H04L 5/0048* (2013.01); *H04L 5/0064* (2013.01); *H04L 5/0085* (2013.01); *H04W 88/08* (2013.01); *H04L 5/0096* (2013.01); *H04W 88/02* (2013.01)

(56) References Cited

U.S. PATENT DOCUMENTS

| | | |
|---|---|---|
| 2012/0207199 A1 | 8/2012 | Guo et al. |
| 2012/0288022 A1 | 11/2012 | Guey et al. |
| 2013/0039203 A1 | 2/2013 | Fong et al. |
| 2013/0044707 A1 | 2/2013 | Chen |
| 2013/0044728 A1 | 2/2013 | Guo et al. |
| 2013/0301467 A1* | 11/2013 | Kang .................. H04B 7/024 370/252 |

OTHER PUBLICATIONS

International Search Report dated Jan. 23, 2014, for corresponding International Application No. PCT/CN2013/073939, 2 pages.

* cited by examiner

METHOD OF MAPPING CSI-RS PORTS TO RESOURCE BLOCKS, BASE STATION AND USER EQUIPMENT

TECHNICAL FIELD

The present disclosure relates to a method of mapping CSI-RS (channel state information-reference signal) ports to resource blocks in FD-MIMO (full dimension multiple-input multiple-output) communication system in LTE (Long Term Evolution).

BACKGROUND ART

Beamforming which is a kind of multiple antenna technology has been already adopted in early Long Term Evolution (LTE) standard release to enhance the coverage throughput. With respect to this technology, people were mainly focusing on azimuth domain so far. For example, how to form a horizontal beam using a certain weighting vector has been studied. In elevation domain, a fixed down-tilt instead of a certain dynamic beam is supported in current LTE system.

With the increase of requirement on the elevation domain beamforming, 3D beamforming seems more and more important especially in urban area, in which users locate on different floors of the building. Using traditional horizontal beamforming technology can not serve these users very well, so the elevation domain and the horizontal domain both need to consider beamfoming, which is actually the 3D beamforming.

FIG. 1 shows an example of typical 3D beamforming. As shown in FIG. 1, the 3D beam sent from eNB (base station) 101 is serving the users on a certain floor. The beam could also serve the users on another floor dynamically. Therefore, the 3D beamforming could utilize vertical antenna units (or vertical beamforming) to further improve the system performance and potentially reduce the interference to other cells. To realize the 3D beamforming, the active antenna system (AAS) is the basis.

FIG. 2 shows a general AAS radio architecture in 3GPP TR 37.840. As shown in FIG. 2, a transceiver unit array (TUA) 201 assumes one-by-one mapping between the transceiver units #1, #2, . . . #K and the antenna ports. A radio distribution network (RDN) 202 could realize the mapping between the TUA 201 and the antenna array 203. By using the AAS system, a network could dynamically adjust all the elevation (or downtilt) and azimuth of the beam, and relevant beamwidth.

As the 3GPP TR 37.840 indicates, there could be different AAS deployment scenarios, such as Wide Area AAS (Macro AAS), Medium Range AAS (Micro AAS), and Local Area coverage AAS (Pico AAS), depending on the level of minimum coupling loss, the location of eNB (base station) antennas, etc. The range of each AAS scenario could be benefited from the 3D beamforming.

In 3GPP Release12, potentially two study items related with 3D beamforming would be discussed: one is the elevation beamforming and another is the FD-MIMO. The former assumes maximum 8 antenna ports and the latter could support {16, 32, 64} or even larger antenna ports. The antenna port is kind of logical signals which may be transmitted by several antenna units (physical antennas).

FIG. 3 shows a FD-MIMO with 8×8 antenna array structure. As shown in FIG. 3, the FD-MIMO which supports 64 antenna units potentially may need 64 CSI-RS ports to estimate the full dimension channels. In the 8×8 antenna array structure, the space of respective antennas may be 0.5λ.

FIG. 4 schematically shows CSI-RS regions per PRB (physical resource block) in release 11 of LTE. As shown in FIG. 4, the regions indicated with slash line "\" are the CSI-RS ports on the PRB for transmitting CSI-RS signals from the base station to user equipments. If it is true that 64 CSI-RS ports are needed for the FD-MIMO, the problem is that in current release 11 of the LTE, only 40 REs (resource element) are used as the CSI-RS ports per PRB. So how to allocate 64 CSI-RS ports to 40 REs on PRB is a problem.

SUMMARY OF THE DISCLOSURE

The present disclosure is made in consideration of the above aspects.

According to one aspect of the present disclosure, there is provided a communication method of mapping CSI-RS ports onto resource blocks, comprising steps of: mapping a first group of CSI-RS ports onto the resource blocks in a first transmission period; and mapping a second group of CSI-RS ports onto the resource blocks in a second transmission period, wherein the number of the CSI-RS ports in the first group is more than that in the second group, and the first transmission period is longer than the second transmission period.

In the present disclosure, the communication method further comprising steps of mapping a third group of CSI-RS ports onto the resource blocks in a third transmission period, wherein the number of the CSI-RS ports in the third group is less than that in the first group and more than that in the second group, and the third transmission period is shorter than the first transmission period and longer than the second transmission period.

In the present disclosure, the first group of CSI-RS ports includes relatively more CSI-RS ports (for example 64 ports), the second group of CSI-RS ports includes relatively less CSI-RS ports (for example 16 ports), and the third group of CSI-RS ports includes another part of full ports but its number is between the number of first group of CSI-RS ports and the number of second group of CSI-RS ports, for example 32 or 48 ports.

In the present disclosure, the first group of CSI-RS ports is used for user equipments with low mobility, the second group of CSI-RS ports is used for user equipments with high mobility, and the third group of CSI-RS ports is used for user equipments with medium mobility.

In the present disclosure, a message indicating the configuration of the CSI-RS ports on the resource blocks and/or a message indicating a power boosting variation pattern is configured by RRC signaling, MAC signaling or L1 signaling.

According to another aspect of the present disclosure, there is provided a communication method of mapping CSI-RS ports onto resource blocks, comprising steps of: mapping a first group of CSI-RS ports onto the resource blocks in a first transmission period; and mapping a second group of CSI-RS ports onto the resource blocks in a second transmission period, wherein the second group of CSI-RS ports are formed by cyclically shifting the first group of CSI-RS ports.

In the present disclosure, the cyclically shifted offset is configured by a base station using RRC signaling.

According to a further aspect of the present disclosure, there is provided a communication method of mapping CSI-RS ports onto resource blocks, comprising steps of mapping a first group of CSI-RS ports onto the resource blocks in first half of a first transmission period, a second group of CSI-RS ports onto the resource blocks in second half of the first transmission period; and mapping the second group of CSI-RS ports onto the resource blocks in first half of a second transmission period, and the first group of CSI-RS ports onto the resource blocks in second half of the second transmission period, wherein the second group of CSI-RS ports are formed by cyclically shifting the first group of CSI-RS ports.

In the present disclosure, the cyclically shifted offset is configured by a base station using RRC signaling.

According to a further aspect of the present disclosure, there is provided a base station for mapping CSI-RS ports onto resource blocks, comprising: a mapping unit configured to map a first group of CSI-RS ports onto the resource blocks in a first transmission period, and a second group of CSI-RS ports onto the resource blocks in a second transmission period, wherein the number of the CSI-RS ports in the first group is more than that in the second group, and the first transmission period is longer than the second transmission period.

In the present disclosure, the mapping unit is further configured to map a third group of CSI-RS ports onto the resource blocks in a third transmission period, wherein the number of the CSI-RS ports in the third group is less than that in the first group and more than that in the second group, and the third transmission period is shorter than the first transmission period and longer than the second transmission period.

In the present disclosure, the first group of CSI-RS ports includes relatively more CSI-RS ports (for example 64 ports), the second group of CSI-RS ports includes relatively less CSI-RS ports (for example 16 ports), and the third group of CSI-RS ports includes another part of full ports but its number is between the number of first group of CSI-RS ports and the number of second group of CSI-RS ports, for example 32 or 48 ports.

In the present disclosure, the first group of CSI-RS ports is used for user equipments with low mobility, the second group of CSI-RS ports is used for user equipments with high mobility, and the third group of CSI-RS ports is used for user equipments with medium mobility.

In the present disclosure, a message indicating the configuration of the CSI-RS ports on the resource blocks and/or a message indicating a power boosting variation pattern is configured by RRC signaling, MAC signaling or L1 signaling.

According to a further aspect of the present disclosure, there is provided a base station for mapping a plurality of CSI-RS ports on resource blocks, comprising: a mapping unit configured to map a first group of CSI-RS ports on the resource blocks in a first transmission period, and a second group of CSI-RS ports on the resource blocks in a second transmission period, wherein the second group of CSI-RS ports are formed by cyclically shifting the first group of CSI-RS ports among the plurality of CSI-RS ports.

In the present disclosure, the cyclically shifted offset is configured by RRC signaling.

According to a further aspect of the present disclosure, there is provided a base station for mapping CSI-RS ports onto resource blocks, comprising: a mapping unit configured to map a first group of CSI-RS ports onto the resource blocks in first half of a first transmission period, a second group of CSI-RS ports onto the resource blocks in second half of the first transmission period, and to map the second group of CSI-RS ports onto the resource blocks in first half of a second transmission period, and the first group of CSI-RS ports onto the resource blocks in second half of the second transmission period, wherein the second group of CSI-RS ports are formed by cyclically shifting the first group of CSI-RS ports.

In the present disclosure, the cyclically shifted offset is configured by RRC signaling.

According to a further aspect of the present disclosure, there is provided a user equipment comprising: a receiving unit configured to receive resource blocks from a base station, in which a first group of CSI-RS ports is mapped onto the resource blocks in a first transmission period, and a second group of CSI-RS ports is mapped onto the resource blocks in a second transmission period, wherein the number of the CSI-RS ports in the first group is more than that in the second group, and the first transmission period is longer than the second transmission period.

In the present disclosure, a third group of CSI-RS ports is mapped onto the resource blocks in a third transmission period, wherein the number of the CSI-RS ports in the third group is less than that in the first group and more than that in the second group, and the third transmission period is shorter than the first transmission period and longer than that of the second transmission period.

In the present disclosure, the first group of CSI-RS ports includes relatively more CSI-RS ports (for example 64 ports), the second group of CSI-RS ports includes relatively less CSI-RS ports (for example 16 ports), and the third group of CSI-RS ports includes another part of full ports but its number is between the number of first group of CSI-RS ports and the number of second group of CSI-RS ports, for example 32 or 48 ports.

In the present disclosure, the first group of CSI-RS ports is used for user equipments with low mobility, the second group of CSI-RS ports is used for user equipments with high mobility, and the third group of CSI-RS ports is used for user equipments with medium mobility.

In the present disclosure, a message indicating the configuration of the CSI-RS ports on the resource blocks and/or a message indicating power boosting variation pattern is configured by a base station using RRC signaling, MAC signaling or L1 signaling.

According to a further aspect of the present disclosure, there is provided a user equipment comprising: a receiving unit configured to receive resource blocks from a base station, in which a first group of CSI-RS ports is mapped onto the resource blocks in a first transmission period, and a second group of CSI-RS ports is mapped onto the resource blocks in a second transmission period, wherein the second group of CSI-RS ports is formed by cyclically shifting the first group of CSI-RS ports.

In the present disclosure, the cyclically shifted offset is configured by a base station using RRC signaling.

According to a further aspect of the present disclosure, there is provided a user equipment comprising: a receiving unit configured to receive resource blocks from a base station, in which a first group of CSI-RS ports is mapped onto the resource blocks in first half of a first transmission period, a second group of CSI-RS ports is mapped onto the resource blocks in second half of the first transmission period, and the second group of CSI-RS ports is mapped onto the resource blocks in first half of a second transmission period, and the first group of CSI-RS ports is mapped onto the resource blocks in second half of the second transmission period, wherein the second group of CSI-RS ports is formed by cyclically shifting the first group of CSI-RS ports.

In the present disclosure, the cyclically shifted offset is configured by a base station using RRC signaling.

The communication method, base station, and user equipment of the present disclosure could realize advantages that the average overhead of CSI-RS transmission is largely reduced, and the interference between split CSI-RS ports in different TTIs is averaged and the performance is improved.

BRIEF DESCRIPTION OF THE DRAWINGS

These and/or other aspects and advantages of the present disclosure will become more clear and easier to be understood in detailed description of embodiments of the present disclosure below in conjunction with attached drawings, in which.

DESCRIPTION OF THE EMBODIMENTS

Figure 1:
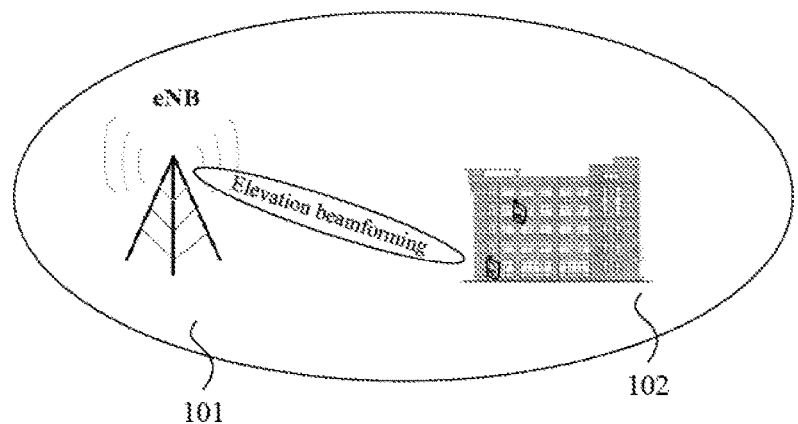
FIG. 1 shows an example of traditional 3D beamforming.
Figure 2:
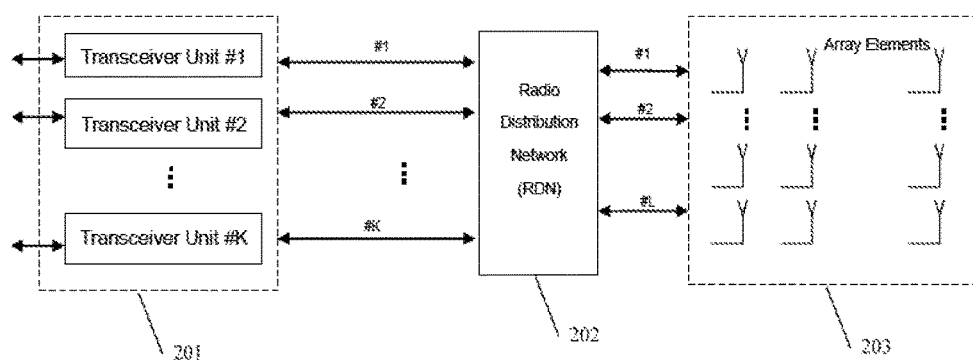
FIG. 2 shows a general AAS radio architecture in 3GPP TR 37.840.
Figure 3:
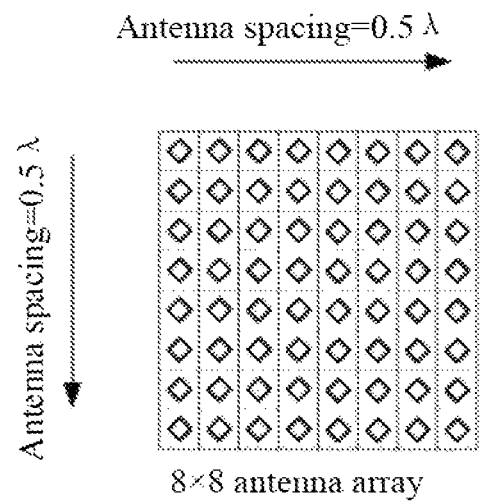
FIG. 3 shows a FD-MIMO with 8×8 antenna array structure.
Figure 4:
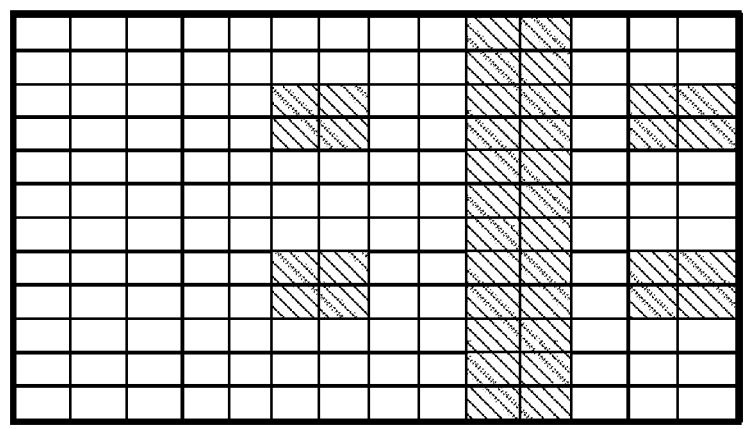
FIG. 4 schematically shows CSI-RS regions per PRB in release 11 of the LTE.

In the following detailed description, reference is made to the accompanying drawings, which form a part of the present disclosure. In the drawings, similar symbols typically indicate similar components, unless the context dictates otherwise. It will be readily understood that aspects of the present disclosure can be arranged, substituted, combined, and designed in a wide variety of different configurations, all of which are explicitly contemplated and make a part of the present disclosure.

In this specification, it is mainly focused on the macro AAS scenario, but any other scenario mentioned above could also be feasible case. In this specification, the FD-MIMO with 64 antenna units is taken as an example, but the present disclosure could also be used for other case such as the elevation beamforming.

The present disclosure will be described below in conjunction with the drawings.

Figure 5A:
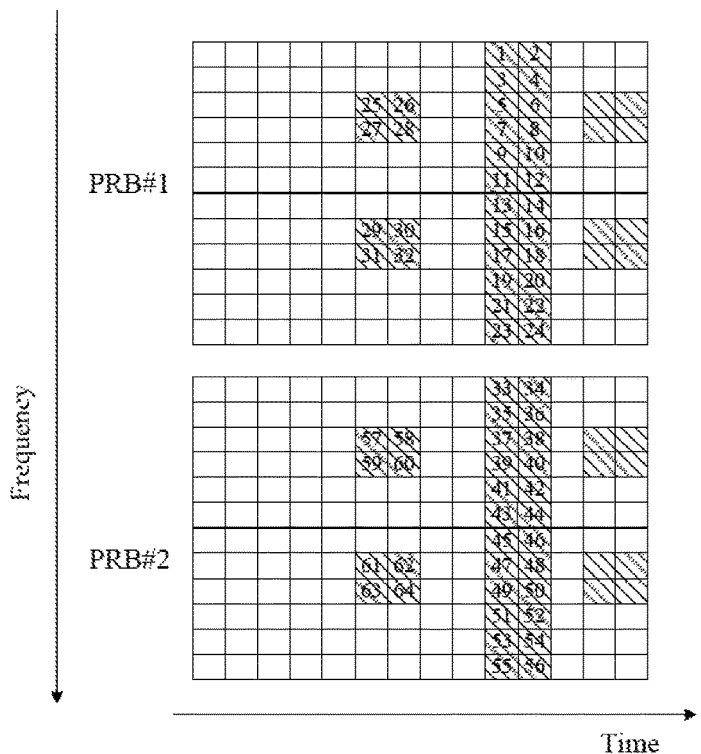
FIG. 5A is a diagram showing FDM and TDM solutions for full CSI-RS port transmission.
Figure 5B:
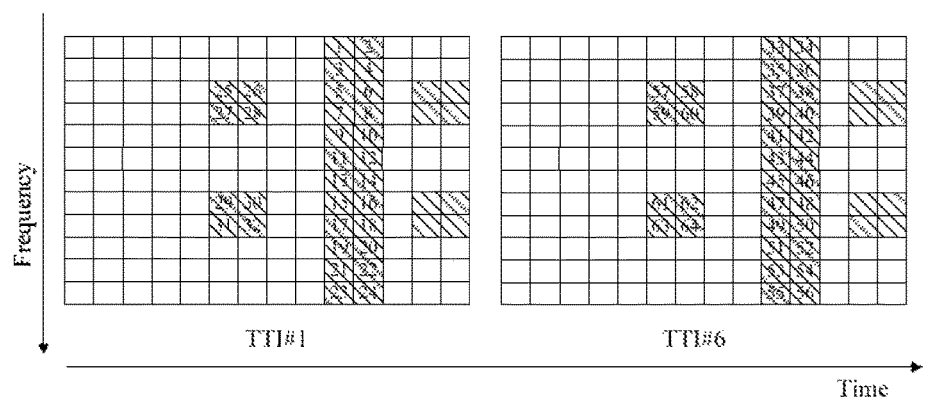
FIG. 5B is a diagram showing FDM and TDM solutions for full CSI-RS port transmission.

FIGS. 5A and 5B are diagrams showing FDM and TDM solutions for full CSI-RS port transmission. To solve the problem stated in the background art, one straightforward way is that the CSI-RS ports are split in TDM or FDM manner, just as shown in FIGS. 5A and 5B. Specifically, as shown in FIG. 5A, PRB #1 and PRB #2 are resource blocks distributed in frequency domain, and according to a straightforward way, 32 CSI-RS ports are mapped onto 32 REs on the PRB #1, and other 32 CSI-RS ports are mapped onto 32 REs on the PRB #2. Alternatively, as shown in FIG. 5B, two resource blocks are distributed in time domain, in which one is TTI #1, and another is TTI #2. According to another straightforward way, 32 CSI-RS ports are mapped onto 32 REs on the PRB of TTI #1, and other 32 CSI-RS ports are mapped onto 32 REs on the PRB of TTI #2. Here, the TTI means transmission time interval. By such solutions, the transmitted CSI-RS ports in each PRB could be less than 40.

Even though straightforward solution could solve the problem that 40 REs are not enough, some further enhancements are probably necessary. At least it can be seen that the overhead is still very large. For example, CSI-RS overhead could be 8 times of that in Rel.10 if we assume 64 CSI-RS ports are split into 2 consecutive PRBs, 5 ms periodicity, and PDSCH RE=11 symbols*12 sub-carriers.

In straightforward solutions, it can also be seen that the CSI-RS ports configuration are not optimized based on UE requirements. Users with different mobility will be configured by full CSI-RS transmission in each period. That would somehow waste the CSI-RS resources largely. Actually based on some analysis, for high mobility user, partial CSI-RS ports with dense periodicity are reasonable by considering that: 1) inaccurate CSI feedback can not support FD-MIMO well (full CSI-RS port transmission is not necessary), 2) delay tolerance is smaller due to fast variation of channels. Instead, for low mobility users, full CSI-RS ports with sparse periodicity are reasonable by considering that: 1) accurate CSI feedback can support FD-MIMO very well, 2) delay tolerance is larger (channel in time domain is more flat), i.e., dense periodicity is not necessary. So the requirement of CSI-RS ports transmission between the high mobility user and the low mobility user is totally different.

1. The First Embodiment

Therefore, according to an embodiment of the present disclosure, it is proposed to configure different CSI-RS ports with different periodicity based on UE requirements (e.g. mobility) to reduce CSI-RS overhead.

Figure 6:
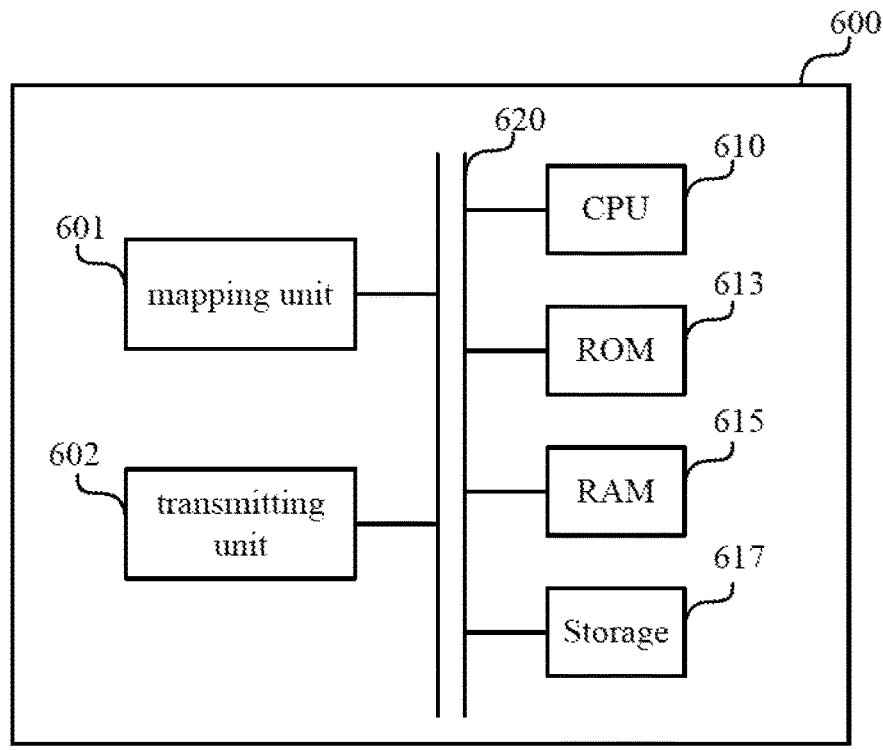
FIG. 6 is a block diagram schematically showing a base station according to an embodiment of the present disclosure.

FIG. 6 is a block diagram schematically showing a base station (eNB) 600 according to an embodiment of the present disclosure. In the present embodiment, the base station 600 has a function of mapping CSI-RS ports to resource elements on the resource blocks, which configure different CSI-RS ports with different periodicity based on UE requirements (e.g. mobility) to reduce CSI-RS overhead. Low speed/mobility users can see all the CSI-RS ports but with relatively long periodicity. For high speed/mobility users, only partial CSI-RS ports with dense periodicity will be configured. So different users would have different configurations on CSI-RS ports, and different CSI-RS groups have different periodicity. As shown in FIG. 6, the blocks indicated with different slash lines represent different CSI-RS ports.

The eNB 600 comprising a mapping unit 601 which is configured to map a first group of CSI-RS ports to the resource blocks in a first transmission period, and map a second group of CSI-RS ports to the resource blocks in a second transmission period, in which the number of the CSI-RS ports in the first group is mare than that in the second group, and the length of the first transmission period is longer than that of the second transmission period.

Figure 7:
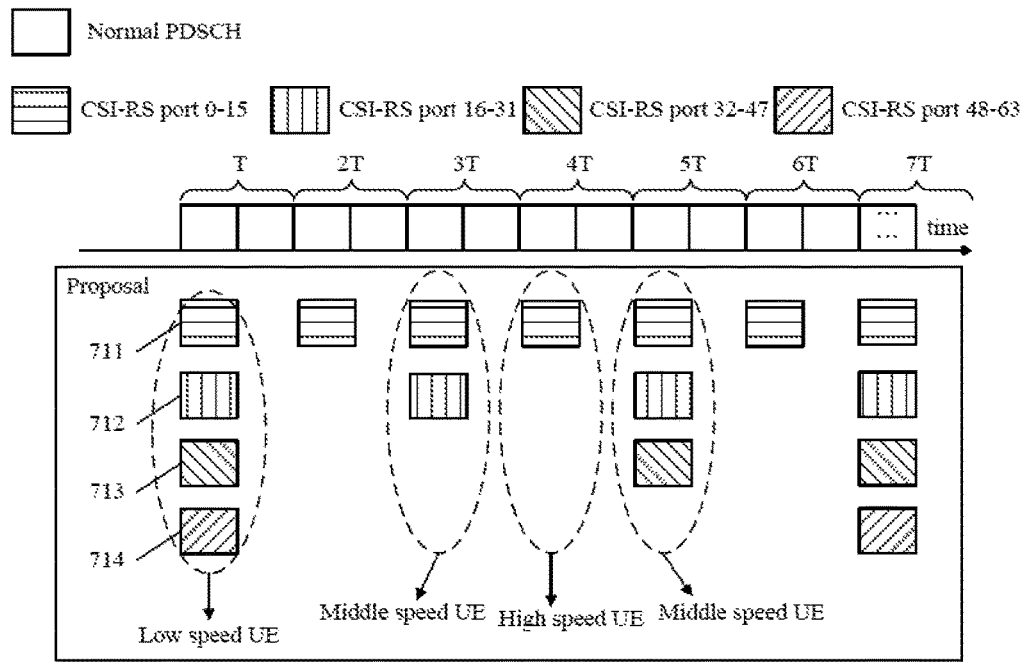
FIG. 7 is a diagram showing operations of the base station mapping the CSI-RS ports to the resource blocks according to the first embodiment of the present disclosure.

FIG. 7 is a diagram showing operations of the base station mapping the CSI-RS ports to the resource blocks according to the first embodiment of the present disclosure. Specifically, as shown in FIG. 7, in a period T (referred to as a first transmission period), the mapping unit 601 maps a (first) group of CSI-RS ports 711,712, 713, 714 to the resource blocks, and in a period 2T (referred to as a second transmission period), the mapping unit 601 maps another (second) group of CSI-RS ports 711 to the resource blocks. Here, as shown in FIG. 7, the CSI-RS ports 711 may comprise such as ports 0-15, the CSI-RS ports 712 may comprise such as ports 16-31, the CSI-RS ports 713 may comprise such as ports 32-47, and the CSI-RS ports 714 may comprise such as ports 48-63. It can be seen that the number of the CSI-RS ports in the first group (711,712, 713, 714) which is 64 is more than that (16) in the second group (711). Here, one period T may for example include two TTIs.

According to the embodiment, as shown in FIG. 7, in each of the periods T, 2T, 3T, 4T, 5T, 6T, 7T, . . . the same group of CSI-RS ports 711 are mapped to the resource blocks, i.e., the length of the transmission period of the CSI-RS ports 711 is T. On the other hand, in a period 7T, the first group of CSI-RS ports 711,712, 713, 714 are mapped to the resource blocks, i.e., the length of the transmission period of the CSI-RS ports 711,712, 713, 714 is 7T−T=6T. It can be seen that the length (6T) of the transmission period of the first group of CSI-RS ports 711,712, 713, 714 is longer than that (T) of the transmission period of the second group of CSI-RS ports 711.

According to another embodiment, as shown in FIG. 7, the mapping unit 601 may further map a third group of CSI-RS ports (a group of CSI-RS ports 711, 712, or a group of CSI-RS ports 711, 712, 713) to the resource blocks in a (third) transmission period 3T or 5T, and it can be seen that the number (32 or 48) of the CSI-RS ports in the third group is less than that (64) in the first group and more than that (16) in the second group, and the length (5T−3T=2T or 9T−5T=4T) of the third transmission period is shorter than that (6T) of the first transmission period and longer than that (T) of the second transmission period.

According to another embodiment, the first group of CSI-RS ports 711, 712, 713, 714 is used for users with low mobility, the second group of CSI-RS ports 711 is used for users with high mobility, and the third group of CSI-RS ports 711, 712, or 711, 712, 713 is used for users with medium mobility.

For this embodiment, we also need to consider two things: for all user equipments, real CSI-RS transmission pattern is necessary to be indicated to do rate matching of PDSCH. The pattern indication could be a manner of RRC, MAC CE or L1 signaling. For example, for RRC signaling, one option is to send a CSI-RS pattern which would reflect the real CSI-RS number transmission, and another option is that the communication system sends all configured CSI-RS patterns used for different user equipments. User equipments will calculate the CSI-RS ports really transmitted based on all these patterns.

Additionally, a Pc (power) pattern of CSI-RS ports should be indicated if power boosting is used for the TTI sending partial ports. Power boosting could be used to improve the SINR if only partial CSI-RS ports are transmitted. For example, as shown in FIG. 7, only 16 CSI-RS ports 711 are transmitted in second period (2T) or fourth period (4T) so that the power boosting could be carried out to improve the signal quality. But when and how the power boosting (Pc in CSI-RS-ConfigNZP-r11) is used should be indicated as well in terms of RRC, MAC, L1 signaling. We can add one field named Pc_pattern in CSI-RS-ConfigNZP-r11 message to indicate the power boosting variation pattern.

Therefore, the eNB 600 may comprise a transmitting unit 602 which is configured to transmit a message indicating the configuration of the CSI-RS ports on the resource blocks and/or a message indicating power boosting variation pattern when partial CSI-RS ports are transmitted to user equipments, in which the message are configured by RRC signaling, MAC signaling or L1 signaling. According to the embodiment, the resource blocks mapping the first group, second group, and third group of CSI-RS ports may be periodically transmitted from the base station to the user equipments by periodically shifting respective groups of CSI-RS ports.

The eNB 600 according to the present disclosure may further include a CPU (Central Processing Unit) 610 for executing related programs to process various data and control the operations of respective units in the eNB 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a storage unit 617 for storing various programs, data and so on. The above mapping unit 601, transmitting unit 602, CPU 610, ROM 613, RAM 615 and/or storage unit 617 etc. may be interconnected via data and/or command bus 620 and transfer signals from one to another.

Respective units as described above do not limit the scope of the present disclosure. According to an embodiment of the present disclosure, the functions of the mapping unit 601 and the transmitting unit 602 may also be implemented by one unit, and the functions of any or combination of the mapping unit 601 and the transmitting unit 602 may also be implemented by functional software in combination with the CPU 610, ROM 613, RAM 615 and/or storage unit 617 etc.

In the first embodiment of the present disclosure, the average CSI-RS overhead could be largely reduced.

2. The Second Embodiment

In the above-stated straightforward solution, it can be seen that the overhead problem may sill exist for partial users with full CSI-RS ports transmission, although the average overhead gets a large reduction. Therefore, in the second embodiment of the present disclosure, it is further proposed to reduce the CSI-RS ports for such kind of users by cyclically shifted transmission of the CSI-RS ports with reduced CSI-RS REs. For example, if totally 64 CSI-RS ports are necessary, only 40 CSI-RS ports are transmitted or only 40 REs are occupied in each PRB in each period, but all these 64 CSI-RS ports would share the 40 CSI-RS REs in a cyclic shifted manner.

Figure 8:
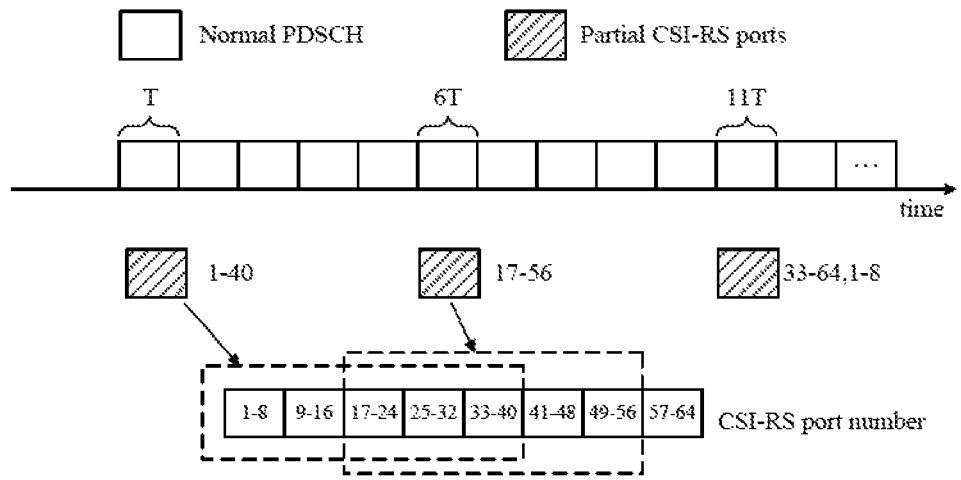
FIG. 8 is a diagram showing the CSI-RS ports by cyclically shifted transmission according to the second embodiment of the present disclosure.

FIG. 8 is a diagram showing the CSI-RS ports by cyclically shifted transmission according to the second embodiment of the present disclosure. As shown in FIG. 8, in each period, only partial CSI-RS ports instead of full CSI-RS ports are transmitted, but all the CSI-RS ports are transmitted in a cyclically shifted manner. For example, in first period T, the CSI-RS ports 1-40 (40 ports) are transmitted, and in second period 6T, the CSI-RS ports 17-56 (40 ports)

are transmitted. Therefore, in each period such as T or 6T, totally 24 resource elements mapping the CSI-RS ports are saved. The cyclically shifted offset of the CSI-RS ports could be any of 8, 16, 24, 32, 40, 48, or 56 ports, and it may be configured by the base station using RRC signaling. Here, one period T may for example include one TTI.

Therefore, according to the embodiment of the present disclosure, the mapping unit 601 of the base station is configured to map a first group of CSI-RS ports (for example, CSI-RS ports 1-40) onto the resource blocks in a first transmission period (for example, T), and map a second group of CSI-RS ports (for example, CSI-RS ports 17-56) onto the resource blocks in a second transmission period (for example, 6T), in which the second group of CSI-RS ports (for example, CSI-RS ports 17-56) are formed by cyclically shifting the first group of CSI-RS ports (for example, CSI-RS ports 1-40) by a shifted offset of 16 CSI-RS ports, among the plurality of CSI-RS ports (for example, 64 CSI-RS ports).

According to another embodiment, the cyclically shifted offset (8, 16, 24, 32, 40, 48, or 56) of the CSI-RS ports do not limit the scope of the present disclosure, it may be any other number such as 1, 2, 4, etc.

In the above second embodiment of the present disclosure, overhead of the CSI-RS ports transmission is much reduced.

3. The Third Embodiment

In the above-stated straightforward solution, there is another issue that if TDM based solution is used, the interference between the split CSI-RS ports in different TTIs may be very large potentially. Therefore, in the third embodiment of the present disclosure, it is proposed to use cyclic shifted transmission for the split CSI-RS groups to somehow relax the potentially larger interference difference.

Figure 9:
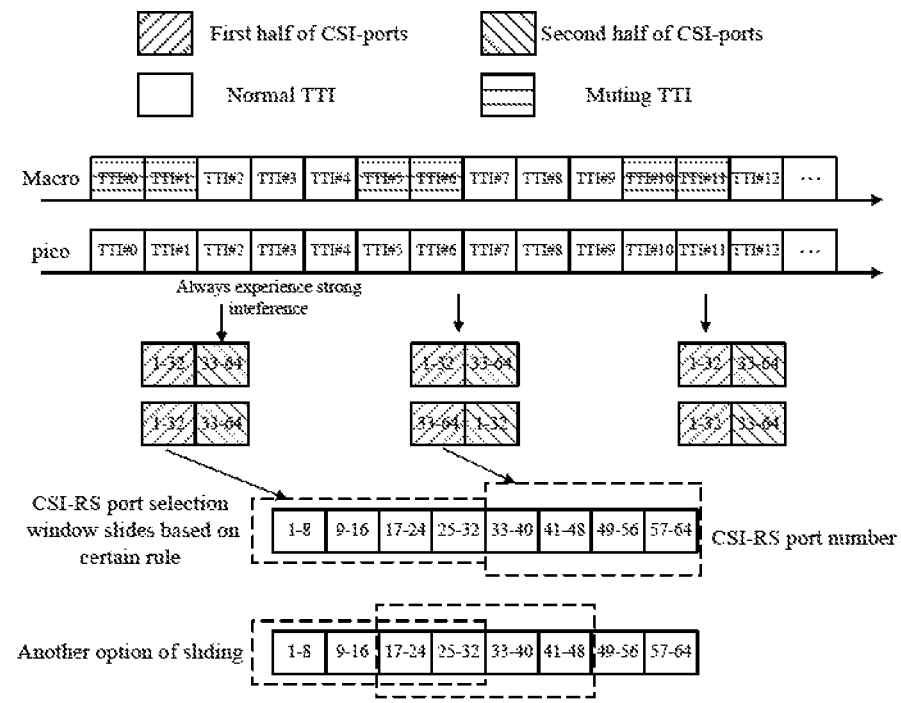
FIG. 9 is a diagram showing a cyclic shifted transmission of split CSI-RS ports according to the third embodiment of the present disclosure.

FIG. 9 is a diagram showing a cyclic shifted transmission of split CSI-RS ports according to the third embodiment of the present disclosure. As shown in FIG. 9(*a*), the split manner is TDM. In the straightforward solution, fixed splitting relationship is always assumed, for example first TTI (TTI #1) sends first half of the CSI-ports 1-32, and second TTI (TTI #2) sends second half of the CSI-RS ports 33-64. The problem of such solution is the potential larger interference difference. For example, as shown in FIG. 9, in TTI #1, due to muting of the macro eNB, a pico cell could get smaller interference, but in TTI #2, the pico cell could see larger interference due to interference from normal transmission of the Macro eNB. So the interference difference between the two CSI-RS groups is large. That would impact the 3D beamforming performance. So in the third embodiment of the present disclosure, it is proposed that the transmission relationship between two CSI-RS groups could be cyclically shifted changed. For example, in the second period, a second half of the CSI-RS ports 33-64 could be transmitted firstly in TTI #6, and a first half of the CSI-RS ports 1-32 could be transmitted secondly in TTI #7. In the third period, the above transmission is repeated.

As shown in FIG. 9(*b*), according to the embodiment of the present disclosure, the mapping unit 601 of the base station 600 is configured to map a first group of CSI-RS ports (ports 1-32) onto the resource blocks in first half (TTI#1) of a first transmission period, a second group of CSI-RS ports (ports 33-64) onto the resource blocks in second half (TTI#2) of the first transmission period, and to map the second group of CSI-RS ports (ports 33-64) onto the resource blocks in first half (TTI#6) of a second transmission period, and the first group of CSI-RS ports (ports 1-32) onto the resource blocks in second half (TTI#7) of the second transmission period, in which the second group of CSI-RS ports (ports 33-64) are formed by cyclically shifting the first group of CSI-RS ports respectively.

FIG. 9(*c*) shows a CSI-RS port selection window sliding based on a certain rule, in which the shifted offset is 32 CSI-RS ports. FIG. 9(*d*) shows another CSI-RS port selection window sliding based on a certain rule, in which the shifted offset is 16 CSI-RS ports. According to an embodiment of the present disclosure, the above shifted offset of the CSI-RS ports does not limit the scope of the present disclosure, and it can be any of 8, 16, 24, 32, 40, 48, or 56 CSI-RS ports or any other value.

According to an embodiment of the present disclosure, the cyclically shifted offset may be configured by the base station using RRC signaling.

In the third embodiment of the present disclosure, the interference between split CSI-RS ports in different TTIs is averaged and the performance is improved.

Figure 10:
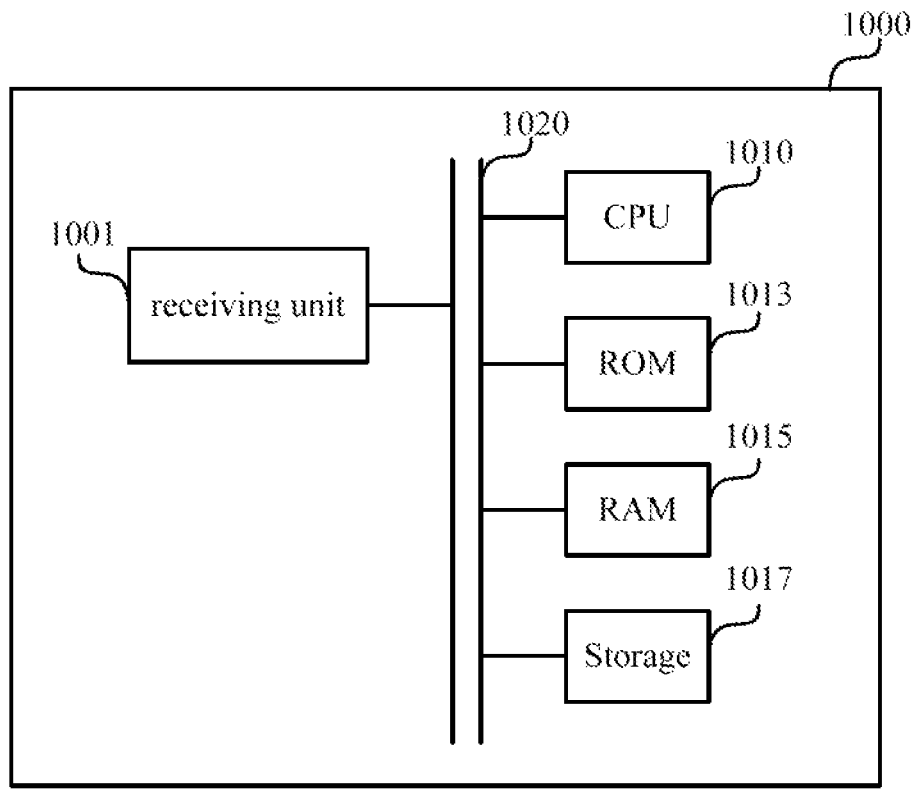
FIG. 10 is a block diagram showing user equipment (UE) according to a further embodiment of the present disclosure.

FIG. 10 is a block diagram showing user equipment (UE) according to a further embodiment of the present disclosure. As shown in FIG. 10, the UE 1000 comprises a receiving unit 1001 which is configured to receive resource blocks from a base station, in which a first group of CSI-RS ports are mapped onto the resource blocks in a first transmission period, and a second group of CSI-RS ports are mapped onto the resource blocks in a second transmission period, wherein the number of the CSI-RS ports in the first group is more than that in the second group, and the first transmission period is longer than the second transmission period.

In another embodiment, a third group of CSI-RS ports are mapped onto the resource blocks in a third transmission period, wherein the number of the CSI-RS ports in the third group is less than that in the first group and more than that in the second group, and the third transmission period is shorter than the first transmission period and longer than the second transmission period.

In another embodiment, the first group of CSI-RS ports includes relatively more CSI-RS ports (for example 64 ports), the second group of CSI-RS ports includes relatively less CSI-RS ports (for example 16 ports), and the third group of CSI-RS ports includes another part of full ports but its number is between the number of first group of CSI-RS ports and the number of second group of CSI-RS ports, for example 32 or 48 ports.

In another embodiment, the first group of CSI-RS ports is used for user equipments with low mobility, the second group of CSI-RS ports is used for user equipments with high mobility, and the third group of CSI-RS ports is used for user equipments with medium mobility.

In another embodiment, a message indicating the configuration of the CSI-RS ports on the resource blocks and/or a message indicating a power boosting variation pattern when partial CSI-RS ports are transmitted is configured by a base station using RRC signaling, MAC signaling or L1 signaling.

In another embodiment of the present disclosure, the receiving unit 1001 is configured to receive resource blocks from a base station, in which a first group of CSI-RS ports is mapped onto the resource blocks in a first transmission period, and a second group of CSI-RS ports is mapped onto the resource blocks in a second transmission period, wherein the second group of CSI-RS ports is formed by cyclically shifting the first group of CSI-RS ports.

In another embodiment, the cyclically shifted offset of the CSI-RS ports may be any of 8, 16, 24, 32, 40, 48, or 56 ports.

In the embodiment, the cyclically shifted offset may be configured by a base station using RRC signaling.

In a further embodiment of the present disclosure, the receiving unit 1001 is configured to receive resource blocks from a base station, in which a first group of CSI-RS ports is mapped onto the resource blocks in first half of a first transmission period, a second group of CSI-RS ports is mapped onto the resource blocks in second half of the first transmission period, and the second group of CSI-RS ports is mapped onto the resource blocks in first half of a second transmission period, and the first group of CSI-RS ports is mapped onto the resource blocks in second half of the second transmission period, wherein the second group of CSI-RS ports is formed by cyclically shifting the first group of CSI-RS ports.

In another embodiment, the cyclically shifted offset of the CSI-RS ports may be any of 8, 16, 24, 32, 40, 48, or 56 ports. In the embodiment, the cyclically shifted offset may be configured by a base station using RRC signaling.

The UE 1000 according to the present disclosure may further include a CPU (Central Processing Unit) 1010 for executing related programs to process various data and control operations of respective units in the UE 1000, a ROM (Read Only Memory) 1013 for storing various programs required for performing various process and control by the CPU 1010, a RAM (Random Access Memory) 1015 for storing intermediate data temporarily produced in the procedure of process and control by the CPU 1010, and/or a storage unit 1017 for storing various programs, data and so on. The above receiving unit 1001, CPU 1010, ROM 1013, RAM 1015 and/or storage unit 1017 etc. may be interconnected via data and/or command bus 1020 and transfer signals from one to another.

Respective units as described above do not limit the scope of the present disclosure. According to an embodiment of the present disclosure, the functions of any or combination of the above receiving unit 1001 may also be implemented by functional software in combination with the above CPU 1010, ROM 1013, RAM 1015 and/or storage unit 1017 etc.

In the above embodiments of the present disclosure, the average overhead of CSI-RS transmission is largely reduced, and the interference between split CSI-RS ports in different TTIs is averaged and the performance is improved.

Figure 11:
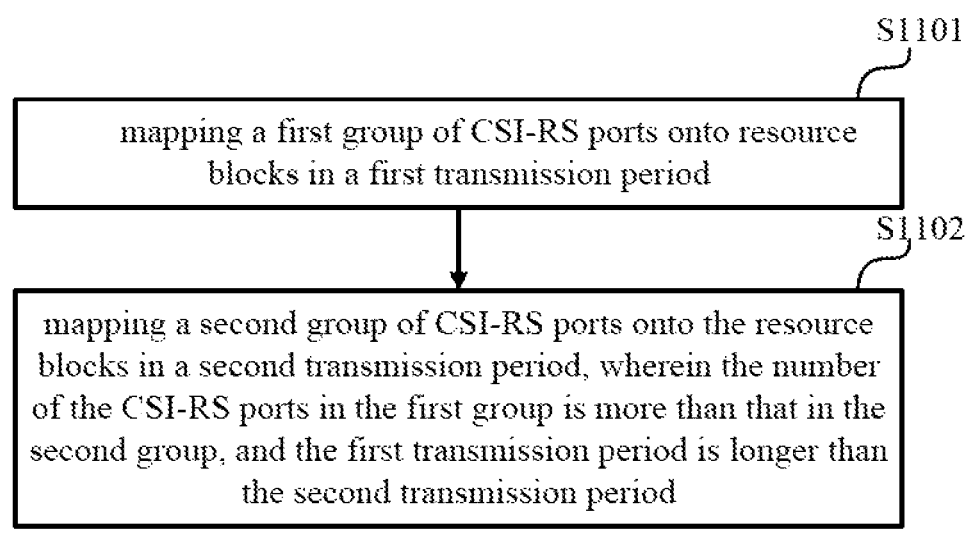
FIG. 11 shows a flow chart of a method of mapping the CSI-RS ports to resource blocks according to the first embodiment of the present disclosure.

FIG. 11 shows a flow chart of a method of mapping the CSI-RS ports to resource blocks according to the first embodiment of the present disclosure. As shown in FIG. 11, the method begins at step S1101. At the step S1101, a first group of CSI-RS ports is mapped onto the resource blocks in a first transmission period. At the step S1102, a second group of CSI-RS ports is mapped onto the resource blocks in a second transmission period, wherein the number of the CSI-RS ports in the first group is more than that in the second group, and the first transmission period is longer than the second transmission period. In the present embodiment, the steps S1101 and S1102 may be performed by the mapping unit 601 of the base station 600 of the present disclosure.

In the embodiment, the method comprising a further step of mapping a third group of CSI-RS ports onto the resource blocks in a third transmission period, wherein the number of the CSI-RS ports in the third group is less than that in the first group and more than that in the second group, and the third transmission period is shorter than the first transmission period and longer than the second transmission period.

In the embodiment, the first group of CSI-RS ports includes relatively more CSI-RS ports (for example 64 ports or more or less), the second group of CSI-RS ports includes relatively less CSI-RS ports (for example 16 ports), and the third group of CSI-RS ports includes another part of full ports but its number is between the number of first group of CSI-RS ports and the number of second group of CSI-RS ports, for example 32 or 48 ports.

In the embodiment, the first group of CSI-RS ports is used for user equipments with low mobility, the second group of CSI-RS ports is used for user equipments with high mobility, and the third group of CSI-RS ports is used for user equipments with medium mobility.

In the embodiment, a message indicating the configuration of the CSI-RS ports on the resource blocks and/or a message indicating a power boosting variation pattern is configured by RRC signaling, MAC signaling or L1 signaling.

Figure 12:
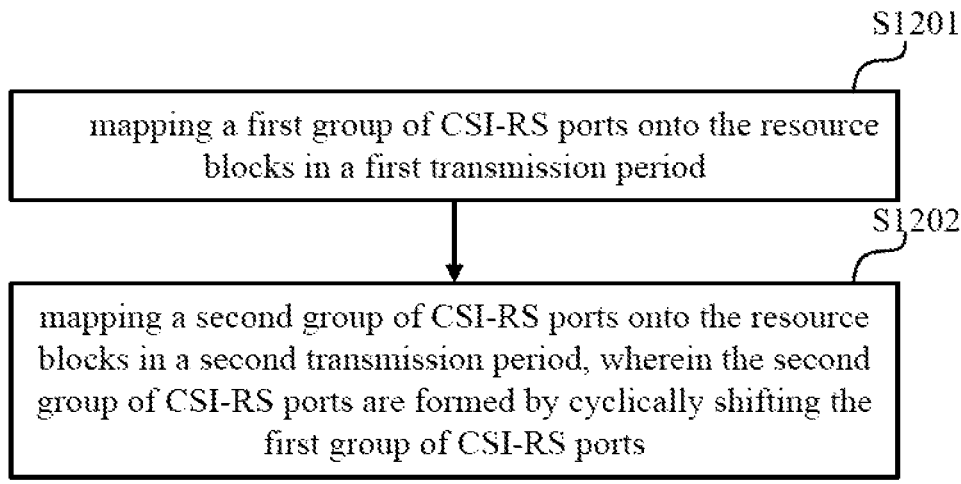
FIG. 12 shows a flow chart of a method of mapping the CSI-RS ports to resource blocks according to the second embodiment of the present disclosure.

FIG. 12 shows a flow chart of a method of mapping the CSI-RS ports to resource blocks according to the second embodiment of the present disclosure. As shown in FIG. 12, the method begins at step S1201. At the step S1201, a first group of CSI-RS ports is mapped onto the resource blocks in a first transmission period. At the step S1202, a second group of CSI-RS ports is mapped onto the resource blocks in a second transmission period, wherein the second group of CSI-RS ports is formed by cyclically shifting the first group of CSI-RS ports. In the present embodiment, the steps S1201 and S1202 may be performed by the mapping unit 601 of the base station 600 of the present disclosure.

In a further embodiment, the cyclically shifted offset of the CSI-RS ports may be 8, 16, 24, 32, 40, 48, or 56 ports. In a further embodiment, the cyclically shifted offset may be configured by a base station using RRC signaling.

Figure 13:
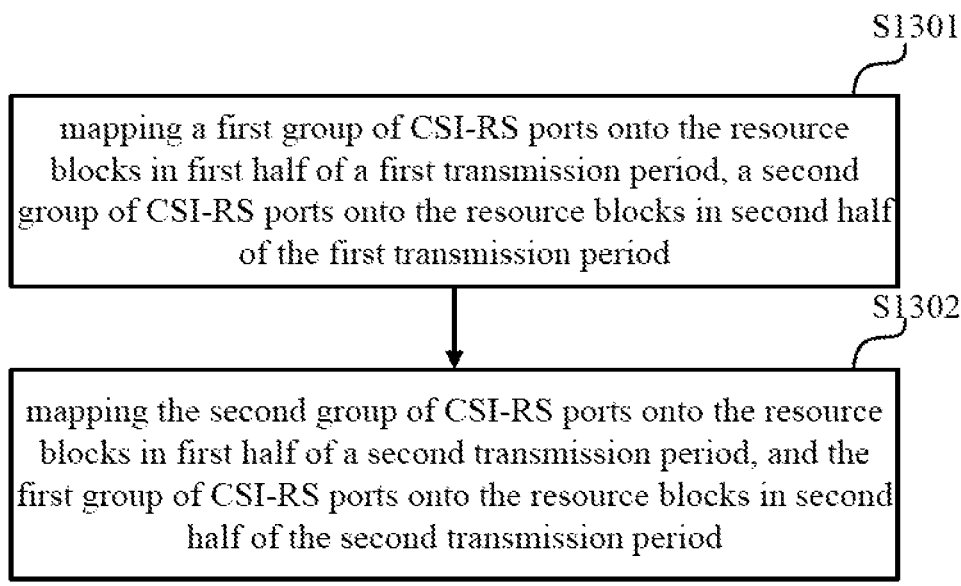
FIG. 13 shows a flow chart of a method of mapping the CSI-RS ports to resource blocks according to the third embodiment of the present disclosure.

FIG. 13 shows a flow chart of a method of mapping the CSI-RS ports to resource blocks according to the third embodiment of the present disclosure. As shown in FIG. 13, the method begins at step S1301. At the step S1301, a first group of CSI-RS ports is mapped onto the resource blocks in first half of a first transmission period, a second group of CSI-RS ports is mapped onto the resource blocks in second half of the first transmission period. At the step S1302, the second group of CSI-RS ports is mapped onto the resource blocks in first half of a second transmission period, and the first group of CSI-RS ports is mapped onto the resource blocks in second half of the second transmission period, wherein the second group of CSI-RS ports is formed by cyclically shifting the first group of CSI-RS ports. In the present embodiment, the steps S1301 and S1302 may be performed by the mapping unit 601 of the base station 600 of the present disclosure.

In a further embodiment, the cyclically shifted offset of the CSI-RS ports may be any of 8, 16, 24, 32, 40, 48, or 56 ports. In a further embodiment, the cyclically shifted offset may be configured by a base station using RRC signaling.

The above embodiments of the present disclosure are only exemplary description, and their specific structures and operations do not limit the scope of the present disclosure. Those skilled in the art can recombine different parts and operations of the above respective embodiments to produce new implementations which equally accord with the concept of the present disclosure.

The embodiments of the present disclosure may be implemented by hardware, software and firmware or in a combination thereof, and the way of implementation does not limit the scope of the present disclosure.

The connection relationships between the respective functional elements (units) in the embodiments of the present disclosure do not limit the scope of the present disclosure, in which one or multiple functional element(s) or unit(s) may contain or be connected to any other functional elements.

Although several embodiments of the present disclosure have been shown and described in combination with attached drawings above, those skilled in the art would understand that variations and modifications which still fall into the scope of claims and their equivalents of the present disclosure can be made to these embodiments without departing from the principle and spirit of the present disclosure.

What is claimed is:

1. A communication method of mapping channel state information-reference signal (CSI-RS) ports onto resource blocks, comprising:
   mapping a first group of CSI-RS ports used for user equipments with low mobility onto the resource blocks in a first transmission period, wherein the first transmission period is a regularly-repeated cycle in which the first group of CSI-RS ports is mapped onto the resource blocks; and
   mapping a second group of CSI-RS ports used for user equipments with high mobility onto the resource blocks in a second transmission period, wherein the second transmission period is a regularly-repeated cycle in which the second group of CSI-RS ports is mapped onto the resource blocks,
   wherein the number of the CSI-RS ports in the first group is more than that in the second group, and the first transmission period is longer than the second transmission period.

2. A base station for mapping channel state information-reference signal (CSI-RS) ports onto resource blocks, comprising:
   a processor, which, in operation, maps a first group of CSI-RS ports used for user equipments with low mobility onto the resource blocks in a first transmission period, and maps a second group of CSI-RS ports used for user equipments with high mobility onto the resource blocks in a second transmission period, wherein the first transmission period is a regularly-repeated cycle in which the first group of CSI-RS ports is mapped onto the resource blocks and the second transmission period is a regularly-repeated cycle in which the second group of CSI-RS ports is mapped onto the resource blocks,
   wherein the number of the CSI-RS ports in the first group is more than that in the second group, and the first transmission period is longer than the second transmission period, and
   a transmitter, which, in operation, transmits the CSI-RS ports mapped onto the resource blocks.

3. The base station of claim 2, wherein the processor further maps a third group of CSI-RS ports used for user equipments with medium mobility onto the resource blocks in a third transmission period, wherein the number of the CSI-RS ports in the third group is less than that in the first group and more than that in the second group, and the third transmission period is shorter than the first transmission period and longer than the second transmission period.

4. The base station of claim 3, wherein the first group of CSI-RS ports includes relatively more ports, the second group of CSI-RS ports includes relatively less ports, and the number of third group of CSI-RS ports is between the number of first group of CSI-RS ports and the number of second of CSI-RS ports.

5. The base station of claim 3, wherein at least one of a message indicating configuration of the CSI-RS ports on the resource blocks and a message indicating power boosting variation pattern is configured by radio resource control (RRC) signaling, media access control (MAC) signaling, or layer 1 (L1) signaling.

6. A user equipment comprising:
   a receiver, which, in operation, receives, from a base station, resource blocks, onto which a first group of channel state information-reference signal (CSI-RS) ports used for user equipments with low mobility is mapped in a first transmission period, and onto which a second group of CSI-RS ports used for user equipments with high mobility is mapped in a second transmission period, wherein the first transmission period is a regularly-repeated cycle in which the first group of CSI-RS ports is mapped onto the resource blocks and the second transmission period is a regularly-repeated cycle in which the second group of CSI-RS ports is mapped onto the resource blocks,
   wherein the number of the CSI-RS ports in the first group is more than that in the second group, and the first transmission period is longer than the second transmission period, and
   a processor, which, in operation, performs channel estimation using at least some of the CSI-RS ports mapped onto the resource blocks.

7. The user equipment of claim 6, wherein a third group of CSI-RS ports used for user equipments with medium mobility is mapped onto the resource blocks in a third transmission period, wherein the number of the CSI-RS ports in the third group is less than that in the first group and more than that in the second group, and the third transmission period is shorter than the first transmission period and longer than that of the second transmission period.

8. The user equipment of claim 7, wherein the first group of CSI-RS ports includes relatively more ports, the second group of CSI-RS ports includes relatively less ports, and the number of third group of CSI-RS ports is between the number of first group of CSI-RS ports and the number of second group of CSI-RS ports.

9. The user equipment of claim 7, wherein at least one of a message indicating configuration of the CSI-RS ports on the resource blocks and a message indicating power boosting variation pattern is configured by a base station using radio resource control (RRC) signaling, media access control (MAC) signaling, or layer 1 (L1) signaling.

* * * * *